United States Patent

Elliott, Jr. et al.

[15] 3,639,099

[45] Feb. 1, 1972

[54] PREPARATION OF HIGH-SILICA FAUJASITE

[72] Inventors: Curtis Homer Elliott, Jr., Baltimore; Carl Vance McDaniel, Laurel, both of Md.

[73] Assignee: W. R. Grace & Co., New York, N.Y.

[22] Filed: Aug. 13, 1970

[21] Appl. No.: 63,657

[52] U.S. Cl. ...................................23/112, 23/113
[51] Int. Cl. .............................................C01b 33/28
[58] Field of Search ................23/112, 113, 111; 252/455

[56] References Cited

UNITED STATES PATENTS

| | | | |
|---|---|---|---|
| 3,071,434 | 1/1963 | Frilette et al. | 23/113 |
| 3,119,660 | 1/1964 | Howell et al. | 23/112 |
| 3,130,007 | 4/1964 | Breck | 23/113 |
| 3,227,660 | 1/1966 | Hansford | 252/455 |
| 3,321,272 | 5/1967 | Kerr | 23/113 |
| 3,334,964 | 8/1967 | Reid | 23/113 |
| 3,343,913 | 9/1967 | Robson | 23/113 |
| 3,433,589 | 3/1969 | Ciric et al. | 23/113 |
| 3,574,538 | 4/1971 | McDaniel et al. | 23/112 |

*Primary Examiner*—Edward J. Meros
*Attorney*—Joseph P. Nigon and Kenneth E. Prince

[57] ABSTRACT

Faujasite having a silica to alumina molar ratio greater than 4 is prepared by forming a reaction mixture having specified proportions of $Na_2O$, $Al_2O_3$, $SiO_2$ and $H_2O$ using as reactants solutions of sodium silicate, sodium aluminate, and an aluminum salt to provide a proportion of the alumina, and crystallizing the reaction mixture in the presence of nucleation centers (zeolitic seeds). Suitable aluminum salts are aluminum sulfate, chloride, and nitrate.

6 Claims, No Drawings

PREPARATION OF HIGH-SILICA FAUJASITE

BACKGROUND OF THE INVENTION

The present invention relates to the production of crystalline alumino silicates commonly referred to as molecular sieves. More specifically, the invention relates to the preparation of faujasite materials using a special technique: (a) to maintain the final product silica to alumina ratio at or above about 4; (b) to decrease the quantity of reactants and (c) to utilize inexpensive raw materials.

Faujasite is a naturally occurring alumino silicate. It has a characteristic X-ray structure. The synthetic materials designated Zeolite X and Zeolite Y by the Linde Division of Union Carbide Corporation are commonly referred to as synthetic faujasites, Zeolite Y is described in U.S. Pat. No. 3,103,007 and is generally similar to Zeolite X described in U.S. Pat. No. 2,882,244. The chemical formula for Zeolite Y given in U.S. Pat. No. 3,103,007 is as follows:

$$0.9 \pm 0.2\ Na_2O:Al_2O_3:WS_iO_2:XH_2O$$

wherein $W$ has a value of greater than 3 and up to about 6 and $X$ may have a value as high as 9.

This phase of faujasite is distinguished from the zeolite designated type X zeolite by the silica to alumina ratio. The silica to alumina ratio affects the important physical properties of the faujasite. The synthetic faujasite having a silica to alumina ratio in excess of 4 and preferably about 5 is more thermally stable than the same material having a lower silica to alumina ratio. As a result, high silica faujasite is particularly useful as a catalyst ingredient or in certain selective adsorption processes wherein the zeolite would be expected to encounter high temperatures during regeneration.

One of the shortcomings of the prior art processes is the requirement that at least a portion of the silica be furnished by a more expensive silica such as silica sol or particulate silica.

The high silica faujasite (silica to alumina ratio above 4) cannot be prepared from sodium silicate and sodium aluminate without the addition of nucleation centers (seeds). When a product having a silica to alumina ratio above 4.0 is to be prepared, it is necessary to reduce solubilization of the silica in the reaction slurry by controlling the basicity of the slurry. The addition of a solution of aluminum sulfate to control the basicity of the reaction slurry while simultaneously providing a portion of the $Al_2O_3$ requirement is the invention claimed.

The preparation of the sodium aluminate and the addition of the proper quantities of nucleation centers (seeds) adds excess sodium hydroxide to the reaction mixture. The sodium hydroxide tends to keep the silica in solution and prevents the interaction of the silica with the alumina to prepare the zeolite having a high silica to alumina ratio.

We have found that synthetic faujasite having a silica to alumina ratio of 4 and higher can be consistently prepared using our novel process.

In our process, a portion of the alumina is furnished by the addition of an aluminum salt solution such as the chloride, sulfate, or nitrate, for example, which decreases the amount of $Na_2O$ necessary in the preparation of the reaction mixture. This is true because a smaller amount of sodium aluminate (and contingent caustic) is needed.

In one embodiment of our process, a substantial portion of the alumina used to prepare the faujasite is provided by the addition of aluminum salt solution, such as the sulfate, for example, one which contains 2 to 12 weight percent alumina. A sodium silicate solution is mixed with the aluminum sulfate solution. A sodium aluminate solution is added to provide the balance of alumina required. Nucleation centers are added to the reaction slurry either before or after the addition of the aluminate. The reaction mixture is then heated to near boiling (180° to 220° F.) until the zeolite is formed. The formation of zeolite is normally completed within 2 to 10 hours.

This process is effective in that it decreases the amount of excess of sodium hydroxide in the reaction mixture and thus avoids the problems caused by solubilization of the silica in the excess sodium hydroxide.

Application Ser. No. 738,116, filed July 19, 1968 now abandoned, describes a process for preparing crystalline alumino silicates using the seeding technique. The zeolite seeds are nucleation centers having an average size below about 0.1 micron. As pointed out in this application, the seeding technique is advantageous in that it decreases the aging time necessary for formation of the zeolite. It should also be emphasized that high silica faujasite cannot be prepared from sodium silicate and sodium aluminate unless the seeding technique is used.

In the conventional process, the reaction product is aged at varying temperatures for periods of 1 to 4 days. Using the seeding technique, the aging time can be substantially reduced.

As pointed out above, the amount of excess sodium hydroxide is decreased by the use of aluminum sulfate to provide a substantial portion of the alumina in the final product. This effectively decreases the excess sodium hydroxide present in that it decreases the amount of sodium added in the preparation.

The first step of the process is the preparation of a precursor mixture. The quantity of sodium silicate necessary to prepare a reaction mixture having the proper amount of silica is prepared from a commercially available sodium silicate to have a silica to sodium oxide ratio of about 3.3 to 1.

The sodium silicate may be diluted if desired although this dilution is not a critical part of the process.

In the second step of the process, the sodium aluminate solution is prepared by dissolving the proper amount of alumina trihydrate in sodium hydroxide. The sodium aluminate solution is prepared to contain about 10% alumina and about 8.3–8.8% $Na_2O$.

The amount of this aluminate solution used in the process is greatly reduced by adding a commercial aluminum sulfate solution containing 2 to 12 weight percent alumina to furnish a portion of the alumina necessary.

The next step of the process is the preparation of the slurry of nucleation centers (seeds). The above-mentioned copending application describes this preparation in some detail. Satisfactory results are achieved by preparing the seed slurry by dissolving commercially available alumina in sodium hydroxide and mixing the solution with commercially available sodium silicate solution. The solutions are conveniently mixed by adding the aluminate solution to the silicate solution with rapid stirring. The slurry is allowed to stand at room temperature for a period of 24 hours. A satisfactory seed slurry is prepared by mixing the solutions to have the molar ratios as follows:

| | |
|---|---|
| $SiO_2/Al_2O_3$ | 14–16 |
| $Na_2O/Al_2O_3$ | 15–17 |
| $H_2O/Na_2O$ | 19–21 |

The nucleation centers can also be prepared by mixing the reactants in the ratios set out above and heating the slurry to 140° F. for a period of about 1 hour.

The above-mentioned copending application describes a process for preparing nucleation centers by aging at room temperature for a period of about 4 hours. This aging time can be shortened to about 1 hour by heating to 140° F.

In our process, the reactant mixture is prepared to contain 3 to 6 moles of $Na_2O$, 1 moles of $Al_2O_3$, 8 to 12 moles of silica, and 120 to 200 moles of water. Preferably, the reactant mixture has the following molar ratios of reactants $3.5\pm0.4 Na_2O:Al_2O_3$ $9.1\pm0.4 SiO_2:131\pm10 H_2O$. The aluminum sulfate solution is normally added to the sodium silicate solution.

The addition of the reagents is complete, the resulting slurry is stirred for an additional period of time. Satisfactory results are achieved when the slurry is stirred for a period of 5 to 15 minutes. A slurry of nucleation centers (seeds) is then added. The nucleation centers are normally added to a concentration of about 0.1 to about 10 percent by weight of the desired product. Although larger amounts of seeds may be added without a deleterious effect, amounts in excess of 10 percent do not substantially increase the formation rate of the product. Mixing for a period of about 10 minutes gives a good dispersion of the seeds in the reaction mixture.

The next step is the addition of the necessary quantity of sodium aluminate to provide the correct molar ratios in the reaction mixture. The molar ratios of aluminum sulfate to sodium aluminate are normally 0.1 and 0.7 based on $Al_2O_3$. The order of the addition can be changed and the sodium aluminate can be mixed into the silicate-aluminum sulfate mixture prior to the addition of the seeds.

The next step of the process is the aging or crystallization step. The crystallization step is carried out for periods of about 2 to 18 hours. Crystallization is normally complete in about 7 hours. The crystallization is carried out by heating the slurry to a temperature of about 80° to 120° C. and maintaining the slurry at that temperature. The progress of the crystallization is followed by sampling the reaction mixture periodically and determining the surface area of the product at that time.

Our invention is further illustrated by the following specific but nonlimiting examples.

EXAMPLE 1

A nucleation center (seed) slurry was prepared by dissolving 26 grams of alumina trihydrate in a solution containing 153 grams of sodium hydroxide in 279 ml. of water. A sodium silicate solution having a silica to alumina ratio of about 3.3 to 1 was diluted by adding 310 grams of water to 525 grams of the silicate. The two solutions were mixed by adding the silicate solution to the sodium aluminate solution at a rate of 150 ml. per minute with rapid stirring during the entire mix. The mixture was allowed to stand for 24 hours at room temperature and was then ready for use. The reactant mole ratios were as follows:

$SiO_2/Al_2O_3$     14–16
$Na_2O/Al_2O_3$     15–17
$H_2O/Na_2O$     19–21

EXAMPLE 2

This example illustrates the preparation of the faujasite by using aluminum sulfate to furnish a portion of the alumina in the reaction mixture.

A total of 2,223 grams of 37.8° Bé sodium silicate solution was mixed with a solution containing 120 grams of a commercially available aluminum sulfate (containing 16.9% $Al_2O_3$) and 481 grams of water. Then 392 grams of nucleation centers were added to this mixture. A sodium aluminate solution was prepared by dissolving 126 grams of a commercially available alumina trihydrate in 191 grams of 50.5 weight percent sodium hydroxide solution heated to 210° F. The solution was diluted by adding 310 grams of water and cooled to 100° F. The aluminate solution was added to the other reactants. The reaction slurry had the following ratio of reactants:

1 $Al_2O_3$:4.2 $Na_2O$:10.2 $SiO_2$:144 $H_2O$

The slurry of components was agitated and heated to 210° F., and maintained at this temperature for a period of 10 hours. An X-ray diffraction pattern of the product showed it contained 96 percent zeolite. The product had a surface area of 840 square meters per gram and a unit cell of 24.68 Angstroms.

EXAMPLE 3

This example illustrates the preparation of the zeolite where the silicate, aluminum sulfate, and sodium aluminate solutions were mixed prior to addition of nucleation centers.

A slurry mixture was prepared to have a reactant ratio of:
1 $Al_2O_3$:4.2 $Na_2O$:10.2 $SiO_2$:144 $H_2O$
The quantities of reactants were the same as in example 2. The reactants were added in the following manner. The aluminum sulfate was added to the silicate solution, the sodium aluminate solution was added to the slurry of the silicate and aluminum sulfate, and the slurry of nucleation centers was added last.

The mixture was agitated and heated to 210° F. and maintained at that temperature for a period of 10 hours. The X-ray diffraction pattern of the product showed it contained 82 percent faujasite. The product had a surface area of 985 square meters per gram and a unit cell of 24.67 Angstroms.

EXAMPLE 4

In this run, duplicate reactant mixtures were prepared to have silica to alumina ratios of 9 to 1 and 10 to 1, respectively.

When the reaction slurry was prepared to have a silica to alumina ratio of 9 to 1, a total of 1,970 grams of a solution of a 38.2° Bé sodium silicate solution was mixed with a solution containing 143 grams of a commercial aluminum sulfate (containing 16.9% alumina) and 413 grams of water. A total of 392 grams of nucleation centers was added to the mixture. A sodium aluminate solution was prepared by dissolving 120 grams of a commercially available alumina trihydrate in 172 grams of a sodium hydroxide solution containing 50.5 weight percent sodium hydroxide and 282 grams of water heated to 210° F. This sodium aluminate solution was cooled to 100° F. and mixed with the silicate and aluminum sulfate slurry of nucleation centers. The mixture heated to 210° F., and maintained at that temperature for a period of 7 hours. The product had a unit cell size of 24.65 Angstroms and a surface area of 827 m.²/g.

When the silica to alumina ratio in the reactant mixture was 10 to 1, a total of 2,223 grams of a 37.8° Bé sodium silicate solution was mixed with a solution containing 120 grams of a commercially available aluminum sulfate (containing 16.9% alumina) and 481 grams of water. Then 392 grams of nucleation centers were added. A sodium aluminate solution was prepared by dissolving 126 grams of a commercially available alumina trihydrate in 191 grams of a sodium hydroxide solution containing 50.5 weight percent sodium hydroxide heated to 210° F. This solution was diluted by adding 310 grams of water and cooled to 100° F. The aluminate solution was mixed in the silicate and aluminum sulfate solution containing the seeds and the slurry was brought up to a temperature of 210°, agitated thoroughly, and maintained at that temperature for 7 hours.

The analysis of the product resulting from the initial silica to alumina reactant mixture was 10 to 1, showed that 96 percent of the product was faujasite by X-ray diffraction. The product had a unit cell of 24.68 Angstroms and a surface area of 840 square meters per gram.

EXAMPLE 5

In this example, solutions of aluminum sulfate were used as a partial source of alumina. Three preparations were made up where the aluminum sulfate was used to provide 0, 10, and 20 percent of the alumina in the reactant mixture.

In these runs, the reactant mixtures were prepared to have a silica to alumina ratio of 10 to 1. In each of these preparations, slurries were made up to contain the desired quantities of sodium silicate and sodium aluminate. A solution of aluminum sulfate was then added with vigorous stirring. A total of 200 ml. of seeds was added per mole of $Al_2O_3$ and the mixture heated for a period of 6 hours. The moles of reactants in each of the runs and the surface area, $Na_2O$ and $SiO_2/Al_2O_3$ content of the product is set out in the table below:

TABLE I

| Free $Na_2O$ ($Na_2O$ − $SO_4$) | $Al_2O_3$ (from aluminate) | $Al_2O_3$ (from sulfate) | $SiO_2$ | $H_2O$ | Product surface area | Analysis $Na_2O$ content | $SiO_2/Al_2O_3$ percent product |
|---|---|---|---|---|---|---|---|
| 4.3 | 1.0 | 0.0 | 10 | 136 | 720 | 15.2 | 4.07 |
| 3.9 | 0.9 | 0.1 | 10 | 136 | 850 | 14.1 | 4.59 |
| 3.5 | 0.8 | 0.2 | 10 | 136 | 940 | 12.6 | 5.47 |

It is apparent from a review of these data that a mixture of aluminum sulfate and sodium aluminate can be used to control the Na$_2$O content and hence the SiO$_2$/Al$_2$O$_3$ ratio of the product. Although the maximum surface area in the series of experiments summarized in table I was obtained when 20 percent of the aluminum was provided by aluminum sulfate, this is undoubtedly due to the interaction between the various reactant ratios. It is obvious to one skilled in the art that lower levels of aluminum sulfate would have resulted in high surface area products if the reactant ratios between Na$_2$O, SiO$_2$, and H$_2$O had been adjusted to optimum values.

What is claimed is:

1. A process for preparing crystalline alumino silicates having the faujasite structure and a silica to alumina ratio of greater than about 4 which comprises preparing a reaction slurry having the following molar ratios of reactants 3–6 Na$_2$O:Al$_2$O$_3$:8–12 SiO$_2$:120–200 H$_2$O by mixing solutions of sodium silicate, sodium aluminate, and an aluminum salt selected from the group consisting of the chloride, the sulfate, and the nitrate to provide about 10 to 90 weight percent of the desired alumina, with zeolitic nucleation centers having an average particle size below about 0.1 micron and prepared from a reaction mixture comprising SiO$_2$, Al$_2$O$_3$, Na$_2$O, and H$_2$O in an amount equal to about 0.1 to 10 weight percent of the reactant mixture heating to about 100° C. for a period of time sufficient to insure crystallization, washing, drying, and recovering the product.

2. A process for preparing a crystalline alumino silicate having the faujasite structure and a silica to alumina ratio above about 4 which comprises preparing a reaction slurry having the following molar ratios of reactants 3–6 Na$_2$O:Al$_2$O$_3$:8–12 SiO$_2$:120–200 H$_2$O by a. Preparing a sodium silicate solution in a concentration sufficient to provide the desired silica content in the product,
b. Preparing an aluminum sulfate solution containing about 10 to 90 weight percent of the desired alumina,
c. Preparing a sodium aluminate solution containing about 10 to 90 weight percent of the desired alumina,
d. Preparing a slurry of zeolitic nucleation centers having an average particle size below about 0.1 micron and prepared from a reaction mixture comprising SiO$_2$, Al$_2$O$_3$, Na$_2$O, and H$_2$O,
e. Mixing the silicate, the aluminum sulfate, and the aluminate solutions,
f. Adding a quantity of said nucleation centers equal to about 0.1 to 10 weight percent of the reactant mixture,
g. Heating to about 100° C. for a period of time sufficient to ensure crystallization, and
h. Washing, drying, and recovering the product.

3. The process according to claim 2 wherein the reaction slurry is heated to about 100° C. for 2 to 10 hours.

4. The process according to claim 2 wherein the nucleation centers are prepared from a reaction mixture wherein the reactants are present in about the following molar ratios

| SiO$_2$/Al$_2$O$_3$ | 14–16 |
| Na$_2$O/Al$_2$O$_3$ | 15–17 |
| H$_2$O/Al$_2$O$_3$ | 19–21 |

5. The process according to claim 2 wherein about 10 to 40 percent of the alumina in the final product is furnished by the addition of aluminum sulfate to the reaction mixture.

6. A process for preparing a crystalline alumino silicate having the faujasite structure and a silica to alumina ratio of greater than about 4.0 which comprises preparing a reaction slurry having the following molar ratio of reactants 3.5±0.4 Na$_2$O:Al$_2$O$_3$:9.1±0.4 SiO$_2$:131±10 H$_2$O wherein the Na$_2$O is titratable as a base, by a. Preparing a sodium silicate solution having a silica to sodium ratio of about 3.3 to 1,
b. Adding an aluminum sulfate solution containing about 10 to 35 weight percent of the desired alumina to the silicate solution,
c. Adding a quantity of zeolitic nucleation centers having an average particle size below about 0.1 micron and prepared from a reaction mixture comprising SiO$_2$, Al$_2$O$_3$, Na$_2$O, and H$_2$O equal to 0.1 to 10 weight percent of the reactant mixture to the sodium silicate-aluminum sulfate mixture,
d. Adding a solution of sodium aluminate containing 90 to 65 weight percent of the desired alumina to the slurry,
e. Heating to about 100° C. for a period of time sufficient to ensure crystallization, and
f. Washing, drying, and recovering the product.

* * * * *